United States Patent [19]

Patel

[11] 4,102,359
[45] Jul. 25, 1978

[54] NOISE SUPPRESSOR

[76] Inventor: Cowas G. Patel, 2179-1 Castor Ct., Tallahassee, Fla. 32303

[21] Appl. No.: 768,801

[22] Filed: Feb. 15, 1977

[51] Int. Cl.² .............................................. F15D 1/02
[52] U.S. Cl. ........................................ 138/42; 138/40; 181/239; 181/276
[58] Field of Search ....................... 138/40, 42, 43, 44; 181/60, 70, 46, 36 A, 36 B, 36 D, 239, 276; 251/120, 121, 126

[56] References Cited

U.S. PATENT DOCUMENTS

| 1,144,306 | 6/1915 | Mock | 251/126 |
|---|---|---|---|
| 1,498,788 | 6/1924 | Deming | 138/40 X |
| 1,790,854 | 2/1931 | DeFronce et al. | 138/40 X |
| 2,043,644 | 6/1936 | Young | 138/42 |
| 2,390,913 | 12/1945 | Barrett | 138/42 X |

FOREIGN PATENT DOCUMENTS

| 1,462,566 | 11/1966 | France | 138/42 |
| 15,314 | 11/1884 | France | 138/40 |

*Primary Examiner*—Richard E. Aegerter
*Assistant Examiner*—James E. Bryant, III
*Attorney, Agent, or Firm*—Beveridge, De Grandi, Kline & Lunsford

[57] ABSTRACT

A noise suppressor for reducing noise resulting from venting of large volumes of high pressure gas. A first pipe member has an open first end, adapted for attachment to a high pressure gas outlet, and a closed second end. A plurality of second pipe members are attached to the first pipe member sidewall and communicate through openings in that sidewall with the interior of the first pipe member. Within the second pipe members a number of plates are positioned, each having several parallel elongated slots therethrough. The plates within each second pipe member are slanted, with the direction of slant alternating between consecutive plates. Preferably, the consecutive plates are rotated 90° and the elongated slots are slanted with respect to the plate surfaces. A further plate member is provided normal to the second pipe member longitudinal axis. The noise suppressor can be coupled to the high pressure gas outlet by valves or directly. The noise suppressor substantially reduces the noise of the venting higher pressure gas.

23 Claims, 6 Drawing Figures

NOISE SUPPRESSOR

The present invention pertains to a noise suppressor. More particularly, the present invention pertains to a noise suppressor well suited for use during the venting of large volumes of high pressure gas.

The use of high pressure steam is very common in various industries, for example utilities such as electric power companies. Very often in such operations, testing procedures are utilized which include the venting of high pressure steam into the atmosphere. Such venting generates noise at extremely high levels, often so high as to be disturbing or even injurious to the human ear. The noise levels might readily exceed 110 descibels at a distance twenty feet from the venting point, where people might be working.

The present invention is a noise suppressor for reducing noise generated in the venting of large volumes of high pressure gas such as high pressure steam. In its preferred embodiment, the noise suppressor of the present invention includes an elongated cylindrical first pipe member having its first end coupled to the high gas vent, for receipt of the high pressure gas therefrom, and its second end closed. A plurality of second pipe members are attached to openings through the sidewall of the first pipe member, with each second pipe member having its second end open. Preferably, the second pipe members are arranged in rows longitudinally along the sidewall of the first pipe member, and preferably, also, each second pipe member has its longitudinal axis lying in a plane with and at an angle of about 45° to the longitudinal axis of the first pipe member. Within each second pipe member there are positioned a plurality of plate members, each of which is provided with a plurality of slots for passage of the gas therethrough.

By way of example, the first pipe member might have a length in excess of 3 feet, preferably about 5 feet. Typically, the first pipe member might haven an internal diameter in the order of about ten inches and might be formed of a high strength pipe material such as ¼ inch steel. Typically, there might be 18 second pipe members arranged in three longitudinally extending rows spaced 90° apart around the circumference of the first pipe member. Each of the three rows, thus, would include six second pipe members. Typically, each second pipe member might have a length in excess of 1 foot, preferably about 18 inches, and an internal diameter in the order of about 6 inches. The second pipe members likewise might be formed of high strength pipe such as a ¼ inch steel pipe.

Each of the plate members is preferably positioned at a slight angle to a plane normal to the longitudinal axis of its second pipe member, for example, an angle in the order of about 3° to about 10°, preferably about 7°, with the direction of the angle alternating between adjacent plate members and with each plate member touching its adjacent plate members so that in cross-section the plate members within a second pipe member appear similar to a compression spring. Each plate member has a plurality of slots extending through it, and preferably these are straight parallel slots, for example five in number. Preferably, the slots pass through the majority of the plate members at a slant, for example, with an angle in the order of about 45°. Preferably also, the adjacent plate members are positioned with their orientation rotated so that the slots of adjacent plate members are at substantially 90° to each other and so that the direction of slanting continually changes over the length of the second pipe members. As a consequence, as the high pressure gas escapes through the second pipe members, the gas is continually deflected and rotated as it passes through each plate member. Any number of plate members might be provided within each second pipe member, preferably between ten and twenty plate members and, more preferably, about 17 plate members. As a consequence, the noise level of venting high pressure gas such as steam is considerably reduced, for example, by as much as 25 decibels. Nevertheless, the noise suppressor is of a simple construction and extremely efficient.

These and other aspects and advantages of the present invention are more apparent in the following detailed description and claims, particularly when considered in conjunction with the accompanying drawings in which like parts bear like reference numerals. In the drawings:

Figure 1:
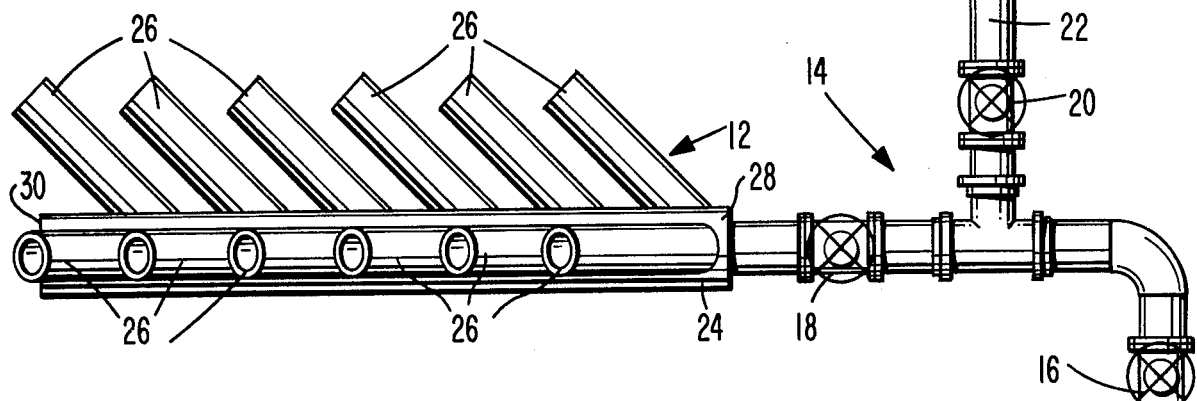
FIG. 1 is a side elevational view of a preferred embodiment of a noise suppressor in accordance with the present invention.

Outlet pipe 10, depicted in FIG. 1, is connected to vent high pressure gas such as steam form a source. Noise suppressor 12 is coupled to outlet pipe 10 by valve assembly 14 which includes valves 16, 18 and 20. Valve 16 couples outlet pipe 10 to the balance of the noise suppressor assembly and permits the entire noise suppressor assembly to be closed off. Valve assembly 16 ordinarily would only be closed during maintenance and repair operations. Valves 18 and 20 permit the main portion of noise suppressor 12 to be isolated from the balance of the system and ordinarily are operated in conjunction with each other so that the escaping gas can flow through noise suppressor 12, when valve 18 is open and valve 20 is closed, or can be blocked from noise suppressor 12 and allowed to escape directly to the atmosphere through pipe 22, when valve 18 is closed and valve 20 is open.

Figure 2:
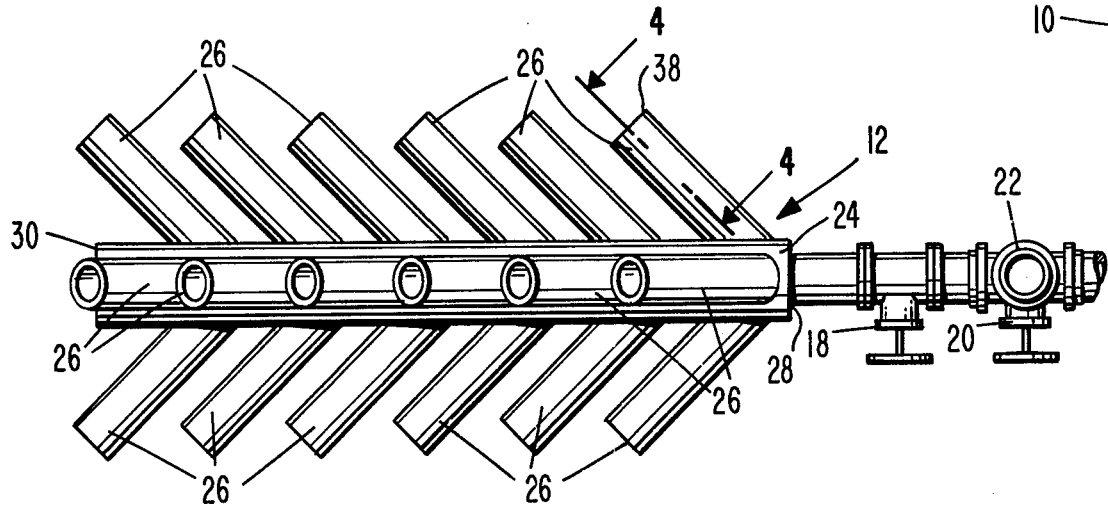
FIG. 2 is a fragmentary plan view of the noise suppressor of FIG. 1.
Figure 3:
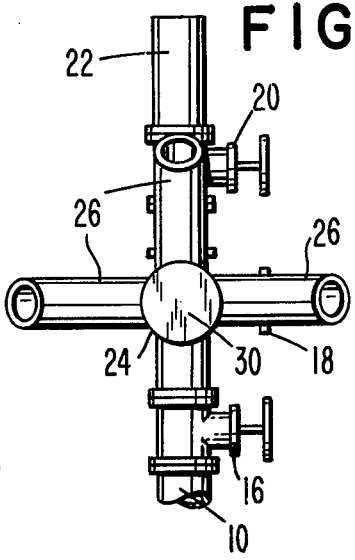
FIG. 3 is an end elevational view of the noise suppressor of FIG. 1.

As seen in FIGS. 1, 2 and 3, noise suppressor 12 includes a first pipe member 24 and a plurality of second pipe members 26. The first end 28 of first pipe member 24 is coupled to the outlet side of valve 18, while the second end 30 of first pipe member 24 is closed. Each second pipe member 26 communicates with an opening through the sidewall of first pipe member 24. The second pipe members 26 are arranged in longitudinally extending straight rows along the surface of first pipe member 24. As seen best from FIGS. 2 and 3, there preferably are three longitudinally extending rows of second pipe members 26 spaced at intervals of substantially 90° around the circumference of first pipe member 24. Each second pipe member 26 preferably has its longitudinal axis lying in a plane with and at an angle to the longitudinal axis of first pipe member 24, for example an angle in the order of about 45°.

Figure 6:
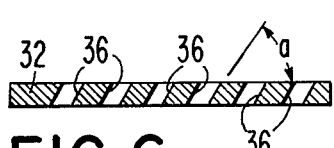
FIG. 6 is an enlarged sectional view taken along line 6—6 of FIG. 5.
Figure 4:
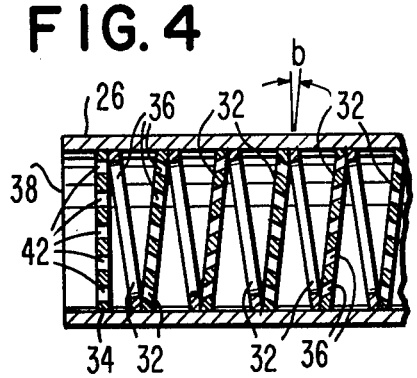
FIG. 4 is a fragmentary sectional view taken along line 4—4 of FIG. 2.
Figure 5:
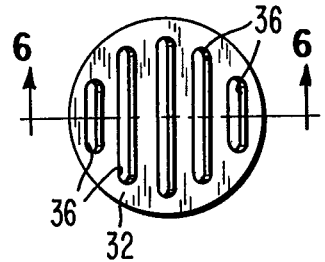
FIG. 5 is a plan view of a plate member suitable for incorporation into the noise suppressor of FIG. 1.

Within each second pipe member 26, a plurality of plate members is arranged, as depicted in FIG. 4. The plate members within each second pipe member 26 include a plurality of first plate members 32, shown in FIG. 5, and an outer plate member 34. Each first plate member 32 has a plurality of elongated openings or slots 36 therethrough. As illustrated by angle $a$ in FIG. 6, the openings 36 of each plate member 32 pass through the plate member at a slant in the order of about 45° to the plane of the surfaces of plate member 32, and as seen from FIG. 4, each plate member 32 is positioned with its slots 36 oriented at 90° to the slots 36 of its adjacent plate members 32. It can be considered that in a given lineal direction within each second pipe member 26, the direction of rotation between consecutive plate members 32 is the same so that the direction of slanting of the slots 36 continually alternates. The plate members 32 are not positioned normal to the longitudinal axis of pipe member 26 but instead, as illustrated by angle $b$ in FIG. 4, are slanted at a slight angle to a plane normal to the longitudinal axis, for example, an angle of from about 3° to about 10°, preferably an angle of about 7°. The direction of slant alternates with adjacent plate members 32 so that each plate member 32 contacts its adjacent plate members within its pipe member 26 as illustrated in FIG. 4. Thus, in cross-section the plate members 32 within a second pipe member 26 have an appearance like a compression spring. The slanting of the plate members 32 results in their being somewhat oval rather than circular. Thus, those plate members 32 which are depicted in FIG. 4 as being positioned within a pipe member 26 with their slots 36 extending vertically have a slightly greater vertical dimension than horizontal dimension when view in plan as in FIG. 5, while those plate members 32 which are depicted in FIG. 4 as being positioned within pipe member 26 with their slots 36 extending horizontally have a slightly greater horizontal dimension than vertical dimension when viewed in plan as in FIG. 5. The degree of slanting of plate members 32, in the order of 10° or less, is small enough that although the plate members are slightly oval, they are, nevertheless, substantially circular, and, in practice, it may be preferred to form all the plate members 32 circular, and so identical, filling in voids between the vertical extremities of the plate members (as viewed in FIG. 5) and the interior surfaces of the second pipe members 26 as the plate members 32 are attached within the pipe members, for example by welding.

Adjacent the outlet end 38 of each second pipe member 26 is a plate member 34 which is positioned normal to the longitudinal axis of the pipe member 26. Plate member 34, thus, is circular when viewed in plan as in FIG. 4. Plate member 34 has a plurality of openings 42 passing therethrough. Openings 42 are not slanted, in the manner of openings 36 through plate members 32, but instead are normal to the surfaces of plate member 34. The openings 42 are elongated and are oriented at 90° to the openings 36 in the adjacent plate member 32.

The 90° rotation between the orientation of the openings 36 and 42 through adjacent plate members 32 and 34 and the consequent alternating of the direction of slanting of the openings 36 through plate members 32 results in the gas being deflected and rotated as it vents so that the gas follows a spiral path as it passes through the second pipe members 26. Any desired number of plate members 32 might be provided within the second pipe members 26, and suitable noise suppression might be obtained with second pipe members 26 having from about 10 to about 20 plate members 32. In a preferred embodiment of the present invention, 16 plate members 32 are provided, together with an additional plate member 34. By way of example, each plate member 32 and 34 can be formed of ¼ inch steel.

The deflection and rotation of the escaping gas results in a considerable reduction in the noise level upon the gas passing to the atmosphere. A noise suppressor in accordance with the present invention might cut down the noise level by as much as 25 decibels while not creating significant back pressure. Although the present invention has been described with reference to a preferred embodiment, numerous modifications and rearrangements could be made, and still the result would be within the scope of the invention.

What is claimed is:

1. A noise suppressor comprising:
   a first elongated cylindrical pipe member having a first end adapted for attachment to a pressurized gas outlet, having a closed second end, and having a plurality of openings through the sidewall thereof;
   a plurality of cylindrical second pipe members, each having a first end attached to the sidewall of said first pipe member over one of the sidewall openings, to permit fluid communication from the interior of said first pipe member to the interiors of said second pipe members, and an open second end; and
   a plurality of plate members, each plate member being substantially circular and having a plurality of substantially parallel elongated slots therethrough, each of said second pipe members having a plurality of said plate members mounted therein, the plate members within each second pipe member slanted with respect to a plane normal to the second pipe member longitudinal axis, the direction of slanting alternating between adjacent plate members, each plate member touching its adjacent plate members.

2. A noise suppressor as claimed in claim 1 in which said first pipe member has a length in the order of 5 feet.

3. A noise suppressor as claimed in claim 2 in which said first pipe member has an internal diameter in the order of 10 inches.

4. A noise suppressor as claimed in claim 3 in which each second pipe member has a length in the order of about 18 inches.

5. A noise suppressor as claimed in claim 4 in which each second pipe member has an internal diameter in the order of about 6 inches.

6. A noise suppressor as claimed in claim 1 in which each second pipe member has a length in the order of about 18 inches.

7. A noise suppressor as claimed in claim 6 in which each second pipe member has an internal diameter in the order of about 6 inches.

8. A noise suppressor as claimed in claim 1 in which said second pipe members are attached to said first pipe member in a plurality of longitudinally extending rows.

9. A noise suppressor as claimed in claim 8 in which each second pipe member has its longitudinal axis in a plane with the first pipe member longitudinal axis.

10. A noise suppressor as claimed in claim 9 in which each second pipe member has its longitudinal axis at an angle in the order of about 45° to the first pipe member longitudinal axis.

11. A noise suppressor as claimed in claim 10 in which said second pipe members are attached to said first pipe member in three longitudinally extending rows.

12. A noise suppressor as claimed in claim 11 in which the three rows are spaced 90° apart around the circumference of said first pipe member.

13. A noise suppressor as claimed in claim 11 in which each row includes six second pipe members.

14. A noise suppressor as claimed in claim 1 in which each plate member is slanted at an angle in the order of about 7° with respect to a plane normal to its second pipe member longitudinal axis.

15. A noise suppressor as claimed in claim 14 in which within each second pipe member each plate member is positioned with its elongated slots oriented at an angle in the order of 90° with respect to the elongated slots of its adjacent plate members.

16. A noise suppressor as claimed in claim 15 in which on at least some of said plate members the plate member elongated slots pass through the plate members at an angle with respect to the plate member surfaces.

17. A noise suppressor as claimed in claim 16 in which the elongated slots pass through the at least some of said plate members at an angle in the order of about 45°.

18. A noise suppressor as claimed in claim 17 further comprising within each second pipe member a further substantially circular plate member having a plurality of elongated slots therethrough normal to the further plate member surfaces, said further plate member positioned substantially normal to the second pipe member longitudinal axis and touching an adjacent plate member.

19. A noise suppressor as claimed in claim 1 in which within each second pipe member each plate member is positioned with its elongated slots oriented at an angle in the order of 90° with respect to the elongated slots of its adjacent plate members.

20. A noise suppressor as claimed in claim 1 in which on at least some of said plate members the plate member elongated slots pass through the plate members at an angle with respect to the plate member surfaces.

21. A noise suppressor as claimed in claim 20 in which the elongated slots pass through the at least some of said plate members at an angle in the order of about 45°.

22. A noise suppressor as claimed in claim 1 further comprising within each second pipe member a further substantially circular plate member having a plurality of elongated slots therethrough normal to the further plate member surfaces, said further plate member positioned substantially normal to the second pipe member longitudinal axis and touching an adjacent plate member.

23. A noise suppressor as claimed in claim 1 further comprising a valve assembly connected to said first pipe member first end for attaching said first pipe member to a pressurized gas outlet while enabling said first pipe member to be isolated from the outlet.

* * * * *